United States Patent
Luthra

Patent Number: 5,736,604
Date of Patent: Apr. 7, 1998

[54] AQUEOUS, TWO-COMPONENT POLYUREA COATING COMPOSITIONS

[75] Inventor: Sanjay Luthra, Eagan, Minn.

[73] Assignee: Bayer Corporation, Pittsburgh, Pa.

[21] Appl. No.: 766,136

[22] Filed: Dec. 17, 1996

[51] Int. Cl.$^6$ .............. C08J 3/00; C08K 3/20; C08L 75/00
[52] U.S. Cl. .............. 524/591; 524/539; 524/839; 524/840
[58] Field of Search .............. 524/539, 591, 524/839, 840

[56] References Cited

U.S. PATENT DOCUMENTS

| | | | |
|---|---|---|---|
| 5,075,370 | 12/1991 | Kubitza et al. | 524/591 |
| 5,126,170 | 6/1992 | Zwiener et al. | 427/385.5 |
| 5,236,741 | 8/1993 | Zwiener et al. | 427/385.5 |
| 5,389,718 | 2/1995 | Potter et al. | 524/591 |

Primary Examiner—Patrick D. Niland
Attorney, Agent, or Firm—Joseph C. Gil; Thomas W. Roy

[57] ABSTRACT

The present invention is directed to an aqueous coating composition having a solids content of 20 to 96% by weight and containing a) a polyisocyanate component which is dispersible in water and has an average NCO functionality of 2 to 6 and b) a polyaspartate corresponding to the formula $$X \!-\!\!\left[ \begin{array}{c} R_3 \\ | \\ NH-C-COOR_1 \\ | \\ CH-COOR_2 \\ | \\ R_4 \end{array} \right]_n \quad (I)$$

and c) water, which is present in an amount of at least 4% by weight, based on the solids content of components a) and b), wherein components a) and b) are present in an amount sufficient to provide an equivalent ratio of isocyanate groups to amino groups of at least 0.9:1.

20 Claims, No Drawings

AQUEOUS, TWO-COMPONENT POLYUREA COATING COMPOSITIONS

BACKGROUND OF THE INVENTION

1. Field of the Invention

The present invention is directed to aqueous coating compositions containing, as binder, hydrophilic polyisocyanates and polyaspartic acid esters.

2. Background of the Invention

Two-component, solvent borne, coating compositions containing, as binder, a polyisocyanate component in combination with an isocyanate-reactive component, in particular a polyhydroxy component, are known. They are suitable for the formation of high quality coatings and can be adjusted to produce coatings which are hard, elastic, abrasion resistant, solvent resistant and especially weather resistant.

Two-component coating compositions, which may be diluted with an organic solvent and contain, as binder, a polyisocyanate component in combination polyaspartic acid esters or blends of polyaspartic acid esters with or without polyhydroxy components, are also known and described in U.S. Pat. Nos. 5,126,170 and 5,236,741. These compositions may be used to formulate coating compositions which have much lower viscosity at equivalent solvent contents than coating compositions in which the isocyanate-reactive component is exclusively based on polyhydroxy compounds. The coating compositions based on polyaspartic esters are known to provide excellent weather resistance and performance similar to two-component, solvent borne polyurethane coating compositions.

The use of such coating compositions allows for reduced emissions of volatile organic compounds, which are being increasingly restricted by various governmental regulations. However, coating compositions based on polyisocyanates and polyaspartic esters can only provide limited volatile organic content (VOC) reduction. Further reductions in volatile organic content cannot be achieved without increasing the viscosity of the compositions to the point where film properties, useful potlife and/or application characteristics are negatively affected.

Two-component, water borne coating compositions containing, as binder, a polyisocyanate or a water-dispersible polyisocyanate component in combination with an isocyanate-reactive component, e.g. water borne or water dispersible polyhydroxy components, are also known and described, e.g., in U.S. Pat. Nos. 5,075,370 and 5,389,718. The use of such compositions allows for the formulation of coating compositions which have zero or no organic solvents, and provide substantially equivalent performance to conventional two-component, solvent borne polyurethane coating compositions.

It is an object of the present invention to provide coating compositions which 1) can be diluted with water such that they do not require the large amounts of solvents required by known two-component, solvent borne polyurethane coating compositions to obtain satisfactory application viscosities, 2) can be formulated at higher solids contents than known aqueous, two-component polyurethane coating compositions and 3) can be used to prepare coatings that possess the desirable properties of known two-component coating compositions.

These objects can be achieved with the aqueous, two-component polyurea coating compositions according to the present invention, which are based on hydrophilic polyisocyanates and polyaspartic acid esters, optionally in admixture with other isocyanate-reactive components. Even though these polyaspartic acid esters are not known to be water dispersible, they can be diluted with water and still provide smooth, continuous films. This would not be the case if the polyaspartic acid esters were not compatible with water.

By using water as a non-organic solvent, improved application characteristics can be achieved without increasing the volatile organic content of the coating compositions according to the invention. An advantage of these coating compositions is that their cure development is not affected by low temperatures (40° F.). The coating compositions can provide a variety of application and physical properties depending upon the type of polyasparatic ester and polyisocyanate component used and the stoichiometric ratios of isocyanate groups to aspartate (secondary amino) groups. Surprisingly, improved chemical resistance can be obtained for coatings prepared from the coating compositions according to the invention by using higher than conventional ratios of isocyanate groups to amino groups.

SUMMARY OF THE INVENTION

The present invention is directed to an aqueous coating composition having a solids content of 20 to 96% by weight and containing a) a polyisocyanate component which is dispersible in water and has an average NCO functionality of 2 to 6 and b) a polyaspartate corresponding to the formula

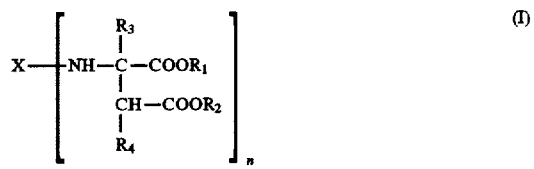

wherein

X represents an organic group which has a valency of n and is inert towards isocyanate groups at a temperature of 100° C. or less, $R_1$ and $R_2$ may be the same or different and represent organic groups which are inert towards isocyanate groups at a temperature of 100° C. or less, or $R_1$ and $R_2$ together with the β-carbon atom form a cycloaliphatic or heterocyclic ring, $R_3$ and $R_4$ may be identical or different and represent hydrogen or organic groups which are inert towards isocyanate groups at a temperature of 100° C. or less and n has a value of 2 to 6, and c) water, which is present in an amount of at least 4% by weight, based on the solids content of components a) and b), wherein components a) and b) are present in an amount sufficient to provide an equivalent ratio of isocyanate groups to amino groups of at least 0.9:1.

DETAILED DESCRIPTION OF THE INVENTION

The polyisocyanate compositions according to the present invention have a minimum average functionality of 2, preferably 2.5 and a maximum average functionality of 6, preferably 4.5.

Suitable polyisocyanate adducts for use in preparing component a) of the present invention include those containing isocyanurate, uretdione, biuret, urethane, allophanate, carbodiimide or oxadiazinetrione groups. Processes for the preparation of polyisocyanate adducts containing these groups are known and described in U.S. Pat. Nos. 4,518,522, 4,663,377 and 5,200,489, the disclosures of which are incorporated by reference. Preferred polyisocyanate adducts according to the present invention are those containing isocyanurate groups, mixtures of isocyanurate groups and allophanate groups (e.g., those described in U.S. Pat. Nos. 5,124,427, 5,208,334 and 5,235,018, the disclosures of which are herein incorporated by reference) and mixtures of isocyanurate groups and uretdione groups.

Suitable monomeric diisocyanates may be represented by the formula

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane diisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 2,4- and/or 2,6-toluylene diisocyanate, and 2,4- and/or 4,4'-diphenyl-methane diisocyanate. 1,6-hexamethylene diisocyanate is especially preferred.

The monomeric polyisocyanates or polyisocyanate adducts used to prepare the aqueous dispersions of the present invention are rendered hydrophilic by reaction with isocyanate-reactive compounds containing cationic, anionic and/or nonionic groups, preferably nonionic groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

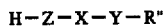

or

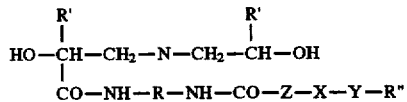

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably hydrogen or a methyl group, R" represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or —NR'"— wherein R'" has the same definition as R" and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

Preferred monohydroxy functional polyethers are those wherein the ethylene oxide portion has a minimum molecular weight of 200, preferably 250 and more preferably 300. The upper limit for the molecular weight of the ethylene oxide portion is 1000, preferably 950, more preferably 900 and most preferably 800. The minimum molecular weight for the entire polyether is 200, preferably 250 and more preferably 300. The upper limit for the molecular weight of the polyether is 1500, preferably 1200, more preferably 1000 and most preferably is the same as the maximum molecular weight of the ethylene oxide portion. In other words the most preferred polyethers are based exclusively on ethylene oxide.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

Suitable starter molecules for the production of the monofunctional polyethers include monoalcohols containing 1 to 12 carbon atoms, preferably 1 to 4 carbon atoms, such as methanol, ethanol, propanol or butanol, cyclohexanol, 3-methyl-3-hydroxymethyl-oxetane and phenol. Additional cyclic starter molecules are set forth in U.S. Pat. No. 4,472,550, the disclosure of which in herein incorporated by reference.

The production of the emulsifiers takes place by reacting the aliphatic polyisocyanates with compounds containing hydrophilic groups as described in the preceding prior art references.

In order to reduce the viscosity of the hydrophilic polyisocyanates, small quantities, i.e., about 1 to 10% by weight, based on the solvent-free polyisocyanate composition, of an organic solvent such as ethylacetate, acetone or methyl ethyl ketone can be added to the compositions before they are used according to the invention. However, it is preferred not to use any organic solvents in the polyisocyanate composition of the present invention.

Suitable polyaspartates for use in accordance with the present invention include those corresponding to the formula:

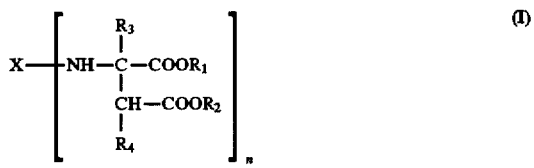

(I)

wherein

X represents an organic group which has a valency of n and is inert towards isocyanate groups at a temperature of 100° C. or less, preferably the group obtained, more preferably the hydrocarbon group obtained, by removing the amino groups from an aliphatic, araliphatic or cycloaliphatic polyamine, more preferably a diamine, and $R_1$ and $R_2$ may be the same or different and represent organic groups which are inert towards isocyanate groups at a temperature of 100° C. or less, preferably an alkyl group containing 1 to 9 carbons and more preferably methyl, ethyl or butyl groups, or $R_1$ and $R_2$ together with the β-carbon atom form a cycloaliphatic or heterocyclic ring, $R_3$ and $R_4$ may be identical or different and represent hydrogen or organic groups which are inert towards isocyanate groups at a temperature of 100° C. or less and n has a value of at least 2, preferably 2 to 6, more preferably 2 to 4 and most preferably 2.

These polyaspartates may be prepared by reacting optionally substituted maleic or fumaric acid esters with polyamines. Suitable optionally substituted maleic or fumaric acid esters are those corresponding to the formula $$R_1OOC—CR_3=CR_4—COOR_2 \qquad (II)$$

wherein $R_1$, $R_2$, $R_3$ and $R_4$ are as defined above.

Examples of optionally substituted maleic or fumaric acid esters suitable for use in the preparation of the polyaspartates include dimethyl, diethyl and dibutyl (e.g., di-n-butyl) esters of maleic acid and fumaric acid and the corresponding maleic or fumaric acid esters substituted by methyl in the 2- and/or 3-position.

Suitable polyamines for preparing the polyaspartates include those corresponding to the formula $$X—(—NH_2)_n$$

wherein X and n are as previously defined.

The polyamines include high molecular weight amines having molecular weights of 400 to about 10,000, preferably 400 to about 6,000, and low molecular weight amines having molecular weights below 400. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines include ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4-and/or 2,4,4-trimethyl-1,6-hexane diamine, 1,7-heptane diamine, 1,8-octane diamine, 1,9-nonane diamine, triaminononane, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diamino-dicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semi-carbazides, phenylene diamine, 2,4- and 2,6-toluylene diamine, 2,3- and 3,4-toluylene diamine, 2,4'- and/or 4,4'-diaminodiphenyl methane, higher functional polyphenylene polymethylene polyamines obtained by the aniline/formaldehyde condensation reaction, N,N,N-tris-(2-amino-ethyl)-amine, guanidine, melamine, N-(2-aminoethyl)-1,3-propane diamine, 3,3'-diamino-benzidine, polyoxypropylene amines, polyoxy-ethylene amines, 2,4-bis-(4'-aminobenzyl)-aniline and mixtures thereof.

Preferred polyamines are 1-amino-3-aminomethyl-3,5,5-trimethyl-cyclohexane (isophorone diamine or IPDA), bis-(4-aminocyclo-hexyl)-methane, bis-(4-amino-3-methylcyclohexyl)-methane, 1,6-diamino-hexane, 2-methyl pentamethylene diamine, ethylene diamine, triaminononane, 2,4- and/or 2,6-toluylene diamine and 4,4'- and/or 2,4'-diamino-diphenyl methane.

Suitable high molecular weight polyamines include those prepared from the known polyhydroxyl compounds of polyurethane, especially the polyethers. The polyamines may be prepared by reacting the polyhydroxyl compounds with an excess of the previously described polyisocyanates to form NCO prepolymers and subsequently hydrolyzing the terminal isocyanate group to an amino group. Preferably, the polyamines are prepared by converting the terminal hydroxy groups of the polyhydroxyl compounds to amino groups, e.g., by amination. Preferred high molecular weight polyamines are amine-terminated polyethers such as the Jeffamine resins available from Texaco.

The preparation of the polyaspartates from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents.

The compositions according to the invention may also contain known additives such as fillers, plasticizers, pigments, carbon black, silica sols, levelling agents, wetting agents, antifoaming agents and stabilizers.

To prepare the two-component coating compositions according to the invention, the isocyanate and aspartate components and optional additives may be mixed with water in any particular order. Preferably, aspartate component is mixed with any additives and then with the isocyanate component. The resulting mixture is then dispersed in water in known manner with simple mixing. However, it is also possible to introduce one of the reactive components, preferably the aspartate component, with water and then introduce the remaining component.

The isocyanate and aspartate components are mixed in amounts which correspond to a minimum equivalent ratio of isocyanate groups to amino groups of 0.9:1, preferably 1.7 and more preferably 4:1, and a maximum equivalent ratio of 20:1, preferably 12:1. If coatings are desired that have better chemical resistance then higher NCO:NH equivalent ratios are used. The flexibility/hardness of the coatings can be altered, e.g., by the selection of the polyamine used to prepare the aspartate.

The resulting compositions have a minimum solids content of 20% by weight, preferably 50% by weight and more preferably 70% by weight. The maximum solids content is 96% by weight, preferably 95% by weight and more preferably 90% by weight. The solids contents of the two-component compositions according to the invention are much higher than those of one-component and two-component polyurethane dispersions, which typically have solids contents of 35 to 40% by weight. Depending upon the solids content and the presence of organic solvents, the coating compositions according to the invention are present either as oil-in-water or water-in-oil emulsions.

In addition to the binder components, the coating compositions may also contain the known additives from coatings technology, such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators and extenders. The additives are chosen based on the requirements of the particular application and their compatibility with components a) and b). The coating compositions may be applied to the substrate to be coated by conventional methods such as painting, rolling, pouring or spraying.

The invention is further illustrated but is not intended to be limited by the following examples in which all parts and percentages are by weight unless otherwise specified.

EXAMPLES

The following starting materials were used in the examples:

The hydrophilically-modified polyisocyanates were prepared by reacting the monofunctional polyethers described hereinafter with an HDI trimer, i.e., an isocyanurate group-containing polyisocyanate prepared by trimerizing a portion of the isocyanate groups of 1,6-hexamethylene diisocyanate; containing tris-(6-isocyanatohexyl)-isocyanurate and higher homologs thereof; and having an isocyanate content of 21.6% by weight, a content of monomeric diisocyanate of <0.2%, a viscosity at 20° C. of 3000 mPa.s and an average isocyanate functionality of about 3.5.

The amount of monofunctional polyether reacted with the polyisocyanate in weight percent, based on the weight of the polyisocyanate, is set forth in the Table. The reaction was carried out under nitrogen and with stirring until the theoretical isocyanate content was obtained, which generally took place after 2 to 3 hours. When the reaction was complete, the reaction product was cooled and stored under dry nitrogen.

Polyisocyanate 1

A modified polyisocyanate was prepared by reacting an HDI trimer (Desmodur 3300, available from Bayer Corp.) with a monofunctional polyether prepared by ethoxylating methanol and having a molecular weight of 350. The modified polyisocyanate contained 12.3% of the polyether.

Polyisocyanate 2

A modified polyisocyanate was prepared by reacting the HDI trimer described above with a monofunctional polyether having a molecular weight of 2150 (OH number—26.2) and prepared by alkoxylating n-butanol with a mixture of ethylene oxide and propylene oxide (molar ratio of ethylene oxide to propylene oxide—83:17).

Polyisocyanate 3

A modified polyisocyanate was prepared by reacting the HDI trimer described above with a monofunctional polyether having a molecular weight of 630 and prepared by alkoxylating n-butanol with a mixture of ethylene oxide and propylene oxide (molar ratio of ethylene oxide to propylene oxide—99:1).

Polyaspartate 1

238 parts of 4,4'-diamino-3,3'-dimethyl-dicyclohexylmethane (available from BASF as Laromin C 260) (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product, which was reduced to 90% solids with n-butyl acetate, was a clear, colorless liquid having a viscosity of about 300 mPa.s (25° C.) and an equivalent weight of about 291, based on solids.

Polyaspartate 2

516 parts of maleic acid diethylester (3.0 moles) were added dropwise with stirring to 403 parts (1.0 mole) of a trifunctional, amine-terminated, propylene oxide polyether (Jeffamine T-403 available from Texaco) that were previously charged at ambient temperature to a 2 L three necked flask equipped with a stirrer, thermometer and an addition funnel. The diester was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 96 mPa.s (25° C.) and an amine equivalent weight of about 306.

Additive 1

A leveling and foam control additive (FC-430, available from 3M) present as a 5% solution in butyl carbitol.

Additive 2

A setting agent (Victawet 35B, available from Stouffer).

Additive 3

A molecular sieve (Baylith L powder, available from Bayer Corp).

Examples 1-19

Coating compositions were prepared by blending the polyaspartates with any additives. Unless indicated to the contrary the resulting mixture was blended with the isocyanate and then with water to form the aqueous coating composition. In certain examples the polyaspartates were blended with water before the addition of the isocyanate. In the comparison examples the coating compositions did not contain water.

The coating compositions were applied to steel panels and glass substrates in a wet film thickness of 3 mils and cured for two weeks at 25° C. and 55% relative humidity. The results are set forth in the following tables.

TABLE 1

|  | Example 1 | Example 2 |
|---|---|---|
| Polyaspartic ester 1 | 292 | 292 |
| Deionized water |  | 32.4 |
| Polyisocyanate 1 | 428 | 428 |
| Dry times in hours |  |  |
| Set to touch | 6.5 | 5.5 |
| Surface dry | 13 | 12 |
| Hard dry | 17.5 | 19 |
| Appearance | Smooth film | Smooth film |
| Taber abrasion, mgs loss | 45.2 | 53 |
| endulum hardness in seconds | 179 | 189 |
| Impact resistance, inches-lbs |  |  |
| Direct | 160 | 130 |
| Reverse | 150 | 160 |
| Chemical spot resistance (4 hours) |  |  |
| Isopropyl alcohol | St | St |
| MEK | St | St |
| Toluene | St | St |
| 50% NaOH | NE | NE |
| 18% NH₄OH | NE | NE |
| Aniline | F | F |
| 50% Sulphuric acid | NE | NE |
| 37% HCl | F | F |
| Acetic acid | F | F |

These examples demonstrate that coatings obtained from the coating compositions according to the invention are virtually the same as those obtained from the known two-component compositions, which do not contain water. Therefore, the use of water as a solvent according to the present invention does not have a detrimental affect on the properties of the resulting coatings.

TABLE 2

|  | Example 3 |  |
|---|---|---|
| Polyaspartic ester 1 (90% in n-butyl acetate) | 26.14 |  |
| Titanium dioxide | 21.48 |  |
| Molecular sieves A | 2.38 |  |
| Polyisocyanate 2 | 20 |  |
| Deionized water | 28 |  |
| Dry time in hours | 2.5 |  |
| Set to touch | 11 |  |
| Hard dry | 14.5 |  |
| Abrasion resistance, loss in mgs | 112.2 |  |
| Pendulum hardness in Seconds | 24° C. | 4.5° C. |
| 1 day | 53.2 | 40.6 |
| 2 days | 79.1 | 73.3 |
| 8 days | 91 | 88.2 |

This example demonstrates that even when the coating compositions are cured at lower than ambient temperatures, the resulting coatings possess properties that are comparable to those obtained at ambient temperature. This is not typical of two-component aqueous coating compositions containing a polyisocyanate and a polyol component.

TABLE 3

|  | Example 4 | Example 5 | Example 6 | Example 7 |
|---|---|---|---|---|
| Polyaspartic ester 1 (90% solids) | 18 |  | 18 |  |
| Polyaspartic ester 2 |  | 18 |  | 18 |
| Polyisocyanate 3 | 14.8 | 15.7 | 14.8 | 15.7 |
| Deionized water | 2 | 2 |  |  |
| Surface appearance | Clear | Clear | Clear | Clear |
| Dry time in hours | 4.5 |  | 4.5 |  |
| Set to touch | 9 |  | 9 |  |
| Hard dry | 13 |  | 13 |  |
| Mar free | 19.5 |  | 19.5 |  |
| Pendulum hardness in seconds | 176 | 51.1 | 182 | 39.2 |
| Chemical spot resistance (24 hour exposure) |  |  |  |  |
| IPA | S | NE | S | S |
| MEK | S | S | S | S |
| Toluene | S | NE | NE | NE |
| 5% Acetic acid | F | F | S,R | F |
| 37% HCl | F | F | F | F |
| 50% sulphuric acid | B | F | B | F |
| Aniline | F | F | F | F |

TABLE 4

|  | Example 8 | Example 9 | Example 10 | Example 11 | Example 12 | Example 13 |
| --- | --- | --- | --- | --- | --- | --- |
| Polyaspartic ester 1 | 25.03 | 25.05 | 25.04 | 25.02 | 4.13 | 4.08 |
| Polyisocyanate 2 | 22.9 | 22.92 | 41.85 | 41.71 | 31.56 | 30.09 |
| Deionized water | 9.58* | 9.58 | 13.83* | 13.83 | 7.83* | 7.94 |
| NCO/NH ratio | 1.1 | 1.1 | 2 | 2 | 9 | 9 |
| 100 Double rubs | Failed | Failed | NE | NE | NE | NE |
| Pendulum hardness in seconds | 174 | 185 | 182 | 172 | 147 | 144 |
| Impact resistance, in-lbs |  |  |  |  |  |  |
| Direct | 60 | 80 | 80 | 80 | 50 | 80 |
| Reverse | 40 | 60 | 20 | 20 | 20 | 30 |
| Chemical spot resistance (4 hour exposure) |  |  |  |  |  |  |
| IPA | S | S | S | S | NE | NE |
| Toluene | S | S | S | S | S | NE |
| MEK | S | S | F | F | S | NE |
| PMA | S | S | NE | NE | NE | NE |
| 37% HCl | F | F | F | F | F | F |
| 50% sulphuric acid | F | F | NE | NE | B | NE |
| 50% NaOH | NE | NE | NE | NE | NE | NE |
| 18% NH$_4$OH | NE | NE | NE | NE | NE | NE |
| Aniline | F | F | F | F | F | F |

*Water added to polyaspartic ester before addition of the polyisocyanate

TABLE 5

|  | Example 14 | Example 15 | Example 16 | Example 17 | Example 18 | Example 19 |
| --- | --- | --- | --- | --- | --- | --- |
| Polyaspartic ester 2 | 25.03 | 25 | 25.03 | 25.04 | 4.07 | 4.05 |
| Polyisocyanate 2 | 34.35 | 34.35 | 40.31 | 40.31 | 35.56 | 35.9 |
| Deionized water | 11.8* | 11.87 | 13.10* | 13.02 | 8.0* | 7.24 |
| NCO/NH ratio | 1.1 | 1.1 | 2 | 2 | 9 | 9 |
| 100 Double rubs | Failed | Failed | Failed | 100 | NE | NE |
| Pendulum hardness in seconds | 88 | 49 | 87 |  | 115 |  |
| Impact resistance, in-lbs |  |  |  |  |  |  |
| Direct | 80 | 80 | 80 | 100 | 80 | 60 |
| Reverse | 40 | 60 | 50 | 50 | 30 | 30 |
| Chemical spot resistance (4 hours exposure) |  |  |  |  |  |  |
| IPA | S | S | S | S | NE | NE |
| Toluene | S | S | S | S | NE | NE |
| MEK | F | S | S | S | NE | NE |
| PMA | NE | S | B,S | B,S | NE | NE |
| 37% HCl | F | F | F | F | F | F |
| 50% sulphuric acid | NE | F | NE | NE | NE | NE |
| 50% NaOH | Ne | NE | NE | NE | NE | NE |
| 18% NH4OH | NE | NE | NE | NE | NE | NE |
| Aniline | F | F | F | F | F | F |

*Water added to polyaspartic ester before addition of the polyisocyanate

The Gardner dry time was determined using a Gardner Circular Drying Time Recorder.

Set-to-touch—During the first stage of drying the film is mobile and partially flows back into the scribed channel. The film may be considered "set-to-touch" when it no longer flows back and the stylus begins to leave a clear channel.

Surface-dry—when sytlus no longer leaves clear channel, but begins to rupture the dry upper layer of the curing film, the film is considered to be "surface-dry."

Hard-dry—when the stylus no longer ruptures the film, but moves freely upon the surface, the cross-section of the film may be considered to have reached the "hard-dry" condition.

Mar-free—When the stylus no longer mars the surface of the film at all the film may be considered to be "mar-free."

Solvent resistance was determined by wetting a cheesecloth with methyl ethyl ketone and then rubbing each panel 100 times. A double rub consists of one back and forth rub against the coated panel. Following a five minute waiting period after the rubs were completed, each panel was scratched with a thumb nail. If there was no evidence of film destruction, the films were rated as passing.

The pendulum hardness of the coatings was determined in accordance with ASTM D-4366-87 (Koenig Pendulum Hardness). Abrasion resistance was determined in accordance with ASTM D-4060 (CS 17 wheels, 1000 cycles and 1000 g weight on each cycle). Impact resistance was determined in accordance with ASTM D-2794.

Chemical spot resistance was determined by placing a drop of the particular liquid on a coated panel and covering it with a 4 oz. glass jar. For those solvents that rapidly evaporate a cotton ball was placed on the coated panel liquids and kept saturated. After the appropriate time interval, the coated panels were washed, evaluated to determine the effect of the liquid, and assigned one of the following classifications:

| | |
|---|---|
| NE | No effect |
| S, R | Film softened, but recovered after 1 hour |
| S | Film softened |
| B | Film blistered |
| F | Film destroyed |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating composition having a solids content of 20 to 96% by weight and comprising
   a) a polyisocyanate which is dispersible in water and has an average NCO functionality of 2 to 6 and
   b) a polyaspartate corresponding to the formula

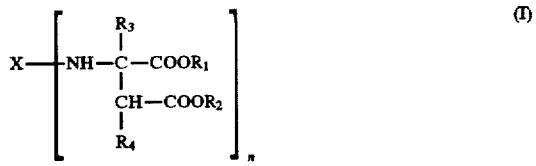

wherein
   X represents an organic group which has a valency of n and is inert towards isocyanate groups at a temperature of 100° C. or less,
   $R_1$ and $R_2$ may be the same or different and represent organic groups which are inert towards isocyanate groups at a temperature of 100° C. or less, or $R_1$ and $R_2$ together with the β-carbon atom form a cycloaliphatic or heterocyclic ring,
   $R_3$ and $R_4$ may be identical or different and represent hydrogen or organic groups which are inert towards isocyanate groups at a temperature of 100° C. or less and
   n has a value of 2 to 6, and
   c) water, which is present in an amount of at least 4% by weight, based on the solids content of components a) and b),
   wherein components a) and b) are present in an amount sufficient to provide an equivalent ratio of isocyanate groups to amino groups of at least 0.9:1.

2. The composition of claim 1 wherein said polyisocyanate is based on a polyisocyanate adduct containing isocyanurate groups.

3. The composition of claim 2 wherein said polyisocyanate adduct is prepared from 1,6-hexamethylene diisocyanate.

4. The composition of claim 1 wherein said X represents the group obtained by removing the amino groups from 4,4'-diamino-3,3'-dimethyl-dicyclohexylmethane.

5. The composition of claim 2 wherein said X represents the group obtained by removing the amino groups from 4,4'-diamino-3,3'-dimethyl-dicyclohexylmethane.

6. The composition of claim 3 wherein said X represents the group obtained by removing the amino groups from 4,4'-diamino-3,3'-dimethyl-dicyclohexylmethane.

7. The composition of claim 1 wherein said X represents the group obtained by removing the amino groups from an amino-terminated polyether.

8. The composition of claim 2 wherein said X represents the group obtained by removing the amino groups from an amino-terminated polyether.

9. The composition of claim 3 wherein said X represents the group obtained by removing the amino groups from an amino-terminated polyether.

10. An aqueous coating composition having a solids content of 20 to 96% by weight and comprising
    a) a polyisocyanate which is dispersible in water and has an average NCO functionality of 2 to 6 and
    b) a polyaspartate corresponding to the formula

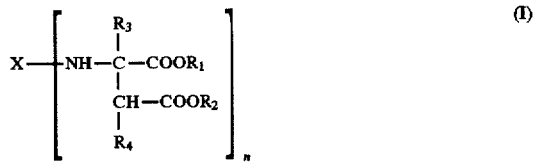

wherein
    X represents an organic group which has a valency of n and is inert towards isocyanate groups at a temperature of 100° C. or less,
    $R_1$ and $R_2$ may be the same or different and represent organic groups which are inert towards isocyanate groups at a temperature of 100° C. or less, or $R_1$ and R 2 together with the β-carbon atom form a cycloaliphatic or heterocyclic ring,
    $R_3$ and $R_4$ may be identical or different and represent hydrogen or organic groups which are inert towards isocyanate groups at a temperature of 100° C. or less and
    n has a value of 2 to 6, and
    c) water, which is present in an amount of at least 4% by weight, based on the solids content of components a) and b),
    wherein components a) and b) are present in an amount sufficient to provide an equivalent ratio of isocyanate groups to amino groups of at least 1.7:1.

11. The composition of claim 10 wherein said polyisocyanate is based on a polyisocyanate adduct containing isocyanurate groups.

12. The composition of claim 11 wherein said polyisocyanate adduct is prepared from 1,6-hexamethylene diisocyanate.

13. The composition of claim 10 wherein said X represents the group obtained by removing the amino groups from 4,4'-diamino-3,3'-dimethyl-dicyclohexylmethane.

14. The composition of claim 11 wherein said X represents the group obtained by removing the amino groups from 4,4'-diamino-3,3'-dimethyl-dicyclohexylmethane..

15. The composition of claim 12 wherein said X represents the group obtained by removing the amino groups from 4,4'-diamino-3,3'-dimethyl-dicyclohexylmethane.

16. The composition of claim 10 wherein said X represents the group obtained by removing the amino groups from an amino-terminated polyether.

17. The composition of claim 11 wherein said X represents the group obtained by removing the amino groups from an amino-terminated polyether.

18. The composition of claim 12 wherein said X represents the group obtained by removing the amino groups from an amino-terminated polyether.

19. The aqueous coating composition of claim 1 wherein the aqueous coating composition has a solids content of 70 to 96%.

20. The aqueous coating composition of claim 10 wherein the aqueous coating composition has a solids content of 70 to 96%.

* * * * *